US006409045B1

(12) United States Patent
Lauer

(10) Patent No.: US 6,409,045 B1
(45) Date of Patent: Jun. 25, 2002

(54) VENDING MACHINE FOR BOTTLES

(76) Inventor: Thomas Robert Lauer, 12931 Shaker Blvd. Apt. 409, Cleveland, OH (US) 44120

( * ) Notice: Subject to any disclaimer, the term of this patent is extended or adjusted under 35 U.S.C. 154(b) by 0 days.

(21) Appl. No.: 09/616,325

(22) Filed: Jul. 15, 2000

Related U.S. Application Data

(63) Continuation-in-part of application No. 09/121,925, filed on Jul. 24, 1998, now Pat. No. 6,112,943.

(51) Int. Cl.[7] ................................................ B65G 59/00

(52) U.S. Cl. ....................... 221/124; 221/125; 221/129; 221/133; 221/151; 221/241; 221/298; 221/301

(58) Field of Search ................................ 221/298, 299, 221/301, 289, 123, 124, 125, 129, 130, 131, 133, 151, 241, 242; 312/72, 73

(56) References Cited

U.S. PATENT DOCUMENTS 2,261,910 A 11/1941 Wright
2,359,984 A 10/1944 Garner
2,393,370 A 1/1946 Hamilton
2,536,204 A 8/1951 Andrews
2,880,904 A * 4/1959 Linthicum
4,269,325 A 5/1981 Durham et al.
4,949,868 A 8/1990 Olson
D362,463 S 9/1995 Vogelphol et al.
5,505,332 A 4/1996 Vogelphol et al.
5,586,687 A 12/1996 Spamer et al.
5,706,978 A * 1/1998 Spamer et al. .............. 221/298
5,947,303 A * 9/1999 Robolin .................. 221/298 X
6,112,943 A * 9/2000 Lauer ..................... 221/298 X

FOREIGN PATENT DOCUMENTS

JP 0228737 9/1989

OTHER PUBLICATIONS

Mead's Necktracker Advertisement.
H.S. Beverage Merchandising "Neck–Glide"System—Advertisement.
ECC Vending Products Advertisement.
Figures 1–7 of a Vending Machine Manufactured by the Assignee of the Present Invention Which Utilizes a Rotating Paddle–Like Device 54 to Push a Bottle 12 Supported by Its Neck From a Slot 38 to an Opening 36 Wherein the Bottle is Dropped to a Dispensing Station.

* cited by examiner

*Primary Examiner*—David H. Bollinger

(57) ABSTRACT

A vending machine for vending a plurality of bottles each of which are supported in an upright position only at a top portion of each of the bottles include a planar dispensing rack having a plurality of elongated slots therein for storing and dispensing bottles. The elongated slots each include a pair of substantially parallel spaced apart side walls which are spaced apart a distance less than a diameter of the top portion of the bottle to be supported in the slots. The distance between the side walls of the slot is adjustable to enable the slot to support bottles having various diameters. The side walls of each of the slots terminate in an opening at one end of each of the slots which opening has a diameter larger than the diameter of the top portion of the bottles supported by the slots to enable bottles which move from the slot to the opening to drop through the opening from the planar dispensing rack to a dispensing station. A gating member is provided to control movement of the bottles from each of the slots to the opening to effect movement of a bottle from the dispensing rack to the dispensing station.

10 Claims, 8 Drawing Sheets

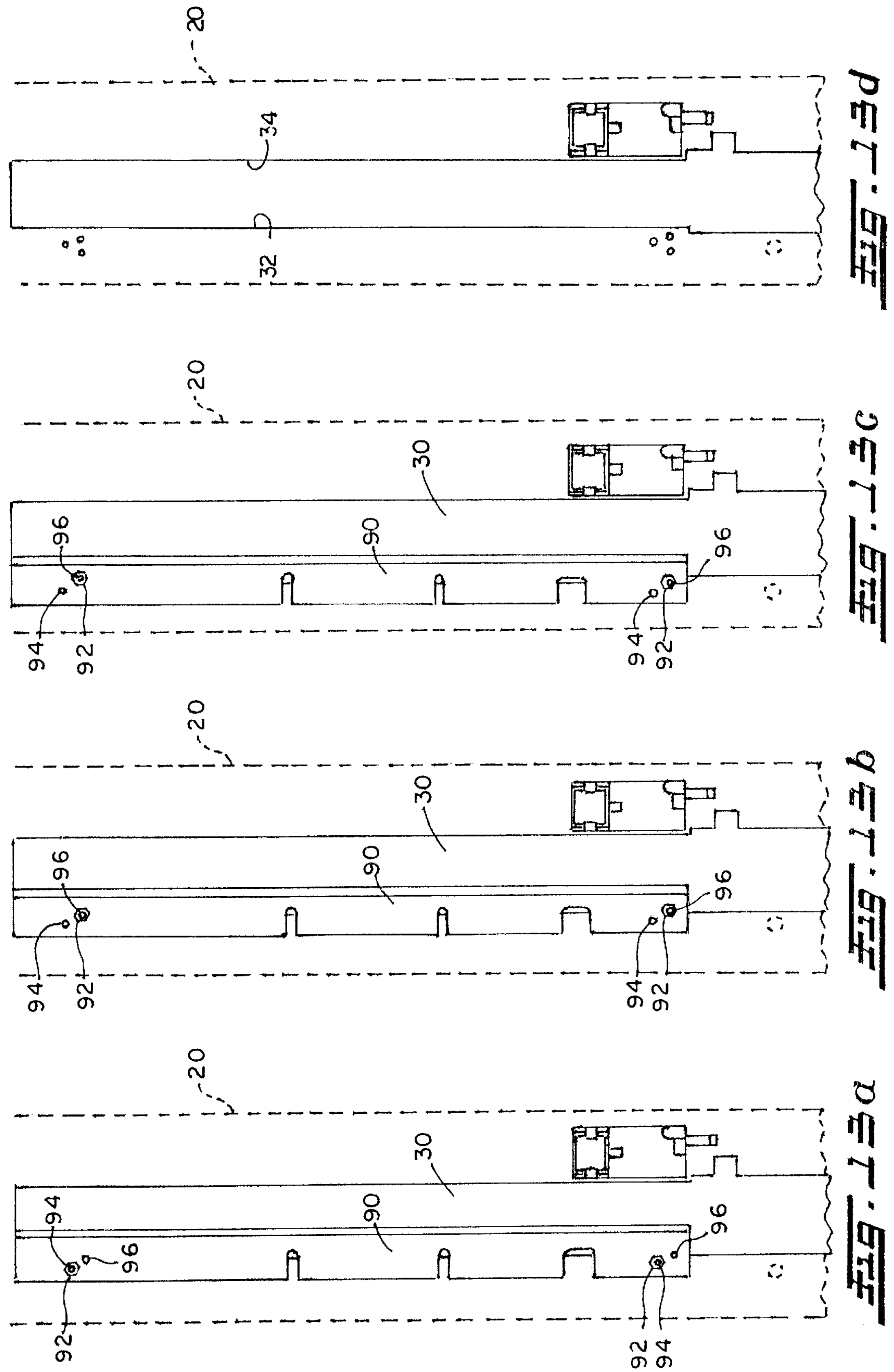
20
34
32
30
90
96
94
92

VENDING MACHINE FOR BOTTLES

RELATED APPLICATION

This application is a continuation-in-part of application Ser. No. 09/121,925, filed Jul. 24, 1998 and assigned to the same Assignee as the present invention and now U.S. Pat. No. 6,112,943.

DESCRIPTION—TECHNICAL FIELD

The present invention relates to vending machines and method for vending bottles and more particularly to a simple, low cost vending machine and method for sequentially vending bottles which are supported in an upright position only at a top portion of the bottles. The vending machine includes a planar dispensing rack having a plurality of elongated slots therein for storing and dispensing bottles from the dispensing rack to a dispensing station from which bottles may be removed from the vending machine. Each of the slots include a pair of substantially parallel spaced apart side walls one of which is adjustable to accommodate bottles of varying width and which terminate at one end in an opening which is larger than the top portion of the bottles supported in the elongated slot to enable bottles which move from the slot into the opening to fall from the dispensing rack to the dispensing station. A pivotable gating member and a method of controlling the gating member is provided to control movement of bottles from the slot to the opening.

BACKGROUND OF THE INVENTION

Vending machines are well known for vending articles such as bottled soda and other beverages. Many known prior art vending machines cost in the range of $3,000 to $5,000 and include complicated and costly mechanisms for storing and dispensing bottles.

Known mechanisms in the prior art have been utilized to dispense bottles which are supported in an upright position only at a top portion of the bottle. However, such known prior art mechanisms are both costly and complicated. The known prior art such as the "Neck-Glide" system sold by H & S Beverage Merchandising in Englewood, N.J. or the "Nektracker" sold by Mead in Atlanta, Georgia, require the use of complicated injection molded tracks to support and dispense bottles. The prior art injection molded tracks cannot be adjusted to accommodate bottles of varying width without removing and replacing the tracks. In addition, the devices such as sold by Mead and H & S Beverage Merchandising only store and dispense bottles in contrast to a vending machine which is operable to store, dispense and vend bottles when coins or a credit of a predetermined value are received in the vending machine. Other known mechanisms such as the typical chest type soda vending machines of the 1950's require costly vending and storage mechanisms and thus do not provide a simple low cost apparatus for vending bottles.

SUMMARY OF THE INVENTION

The present invention provides a simple, low cost vending machine for vending bottles which are supported in an upright position only at a top portion of the bottles and which is adjustable to accommodate bottles of varying size.

The present invention provides a new and improved vending machine for vending a plurality of bottles which are supported in an upright position only at a top portion of the bottles including a storage cabinet having a dispensing station therein, and a planar dispensing rack located in the storage cabinet having at least a single elongated slot for storing and dispensing bottles from the dispensing rack. The slot includes a pair of substantially parallel spaced apart side walls which terminate at one end in an opening. The pair of substantially parallel side walls are spaced apart a distance which is less than the diameter of the top portion of the bottles which are supported in the elongated slot and the opening at the one end of the slot is larger than the diameter of the top portion of the bottles which are supported in the slot to enable bottles which move from the slot to the opening to fall from the dispensing rack to the dispensing station. A pivotable gating member is provided for controlling movement of the bottles from the slot to the opening. The gating member is pivotable between a blocking position in which the gating member prevents movement of bottles in the slot to the opening and dispensing position in which the gating member allows movement of the next bottle to be vended from the slot to the opening. A locking mechanism is provided for locking the gating member in its blocking position. A coin mechanism is connected to the locking mechanism for activating the locking mechanism when coins of a predetermined value are received in the coin mechanism. The coin mechanism is actuated to unlock the locking mechanism to enable the gating member to pivot to its dispensing position in which the next bottle to be vended moves from the slot to the opening to enable the bottle to drop to the dispensing station.

The present invention further provides a new and improved vending machine for vending a plurality of bottles supported in an upright position only at the top portion of the bottles including a storage cabinet having a dispensing station therein, a first planar dispensing rack located in the storage cabinet having a plurality of substantially parallel elongated slots therein for storing bottles and dispensing bottles wherein each of the plurality of slots includes a pair of substantially parallel spaced apart side walls which terminate at one end thereof in an opening with each of the pair of spaced apart side walls being spaced apart a distance which is less than the diameter of the top portion of the bottles supported in the elongated slots to prevent bottles from falling from the elongated slots and each of the openings at the one end of the slots have a diameter which is larger than the diameter of the top portion of the bottle supported in the slots to enable bottles which move from the slots to the openings to fall from the openings to the dispensing station. A plurality of gating members, each of which is associated with one of the plurality of slots, are provided for controlling movement of bottles from the associated slot to its opening at one end thereof. Each of the gating members is pivotable between a blocking position in which the gating member blocks movement of the next bottle to be vended from the slot to the opening and a dispensing position in which the gating member allows movement of the next bottle to be vended from the slot to the opening. A plurality of locking mechanism are provided for locking each of the gating members in their blocking position. A coin mechanism is provided and connected to the locking mechanisms for actuating a selected locking mechanism when coins of a predetermined value are received in the coin mechanism and the coin mechanism is actuated to actuate the selected locking mechanism to enable the associated gating member to pivot from its blocking position to its dispensing position in which the gating member engages the new next bottle to be vended in the associated slot after the next bottle to be vended moves from the slot to the opening and drops to the dispensing station.

Still another provision of the present invention is to provide a new and improved vending machine as set forth in the preceding paragraph further including a second planar dispensing rack located below said first planar dispensing rack and having a plurality of substantially parallel elongated slots therein each of which terminates at one end thereof in an opening for storing and dispensing bottles from the second planar dispensing rack. The plurality of slots in the second planar dispensing rack are substantially aligned in a vertical direction with the plurality of slots in the first planar dispensing rack.

A further provision of the present invention is to provide a new and improved method of vending bottles from a vending machine in which a plurality of bottles are supported at a top portion of the bottle in the slot in an inclined dispensing rack using a pivotable gating member which is selectively engageable with a locking member which prevents pivotable movement of the gating member to control the sequential movement of bottles to be vended through the slot in the inclined dispensing rack under the influence of gravity including the steps of providing a slot in an inclined dispensing rack for supporting the top portions of bottles which includes an opening at one end through which the top portion of the bottles can pass when a bottle is dispensed, supporting at a top portion a plurality of bottles to be vended in the inclined dispensing rack which move under the influence of gravity through the slot toward the one end thereof, locating the pivotable gating member adjacent the slot to control movement of the bottles through the slot to the opening, engaging the locking member with the gating member to lock the gating member in the first position in which the gating member engages with the top portion of the next bottle to be vended to block movement of the next bottle to be vended to the opening at one end of the slot, disengaging the locking member from the gating member to unlock the gating member and allow the gating member to pivot in a first direction to a second position under the influence of the top portion of the next bottle to be vended as the next bottle to be vended slides under the influence of gravity in a downwardly direction through the slots to the opening at one end thereof, and disengaging the next bottle to be vended from the first portion of the gating member when the gating member is in its second position and the next bottle to be vended drops from the slot through the opening.

Still another provision of the present invention is to provide a vending machine for vending a plurality of bottles each of which are supported in an upright position only at the top portion of each of the bottles including a storage cabinet, a dispensing rack having at least a single elongated slot for storing and dispensing bottles from the dispensing rack which bottles each include a top portion which is engaged by and supported by the dispensing rack. The slot includes a pair of substantially parallel spaced apart side walls which terminate at one end in an opening and the side walls are spaced apart a distance which is less than the diameter of the top portion of the bottles which are supported in the elongated slot to prevent bottles from falling from the slot when bottles are supported by the side walls of the slot. Means are provided for adjusting the distance between the parallel spaced apart side walls to enable the slot to support bottles having various diameters at the top portion of the bottles. The opening in the dispensing rack is larger than the diameter of the top portion of the bottles to enable bottles which move from the slot to the opening to be dispensed from the dispensing rack. The dispensing rack is inclined from a horizontal position in a downwardly direction to enable bottles supported in the slot to move under the influence of gravity toward one end of the slot at which the opening is located. A gate member is provided for controlling movement of the bottles through the slot to the opening. The gate member is pivotable between a blocking position in which the gate member blocks movement of bottles from the slot to the opening to a dispensing position in which the gate member enables the next bottle to be vended to move from the slot to the opening to be dispensed from the dispensing rack. A locking mechanism is provided for locking the gate member to prevent the gate member from pivoting from the blocking position and a credit mechanism is connected to the locking mechanism for unlocking the locking mechanism when a credit of a predetermined value is received in the credit mechanism and the credit mechanism is actuated to unlock the locking mechanism to allow the gate member to pivot from the blocking position to the dispensing position to enable the next bottle to be vended to move from the slot to the opening to be dispensed from the dispensing rack.

Still a further provision of the present invention is to provide a new and improved machine for dispensing a plurality of bottles each of which are supported on an upright position only at the top portion of each of the bottles including a storage cabinet, a dispensing rack located in the storage cabinet having at least a single elongated slot located therein for storing and dispensing bottles from the dispensing rack which bottles each include a top portion which is engaged by and supported by the slot in the dispensing rack. The slot includes a pair of substantially parallel spaced apart side walls which terminate at one end in an opening and the spaced apart side walls are spaced apart a distance which is less than the diameter of the top portion of the bottles which are supported in the elongated slot to prevent bottles from falling from the slot when bottles are supported by the side walls of the slot. Means are provided for adjusting the distance between the parallel spaced apart side walls of the slot to enable the slot to support bottles having various diameters at the top portion of the bottles. The opening in the dispensing rack is larger than the diameter of the top portion of the bottles to enable bottles which move from the slot to the opening to fall from the dispensing rack. The dispensing rack is inclined from a horizontal position in a downwardly direction toward the opening in the dispensing rack to enable bottles supported in the slot to move under the influence of gravity toward the one end of the slot in which the opening is located. A gate member is provided for controlling movement of the bottles through the slot to the opening.

BRIEF DESCRIPTION OF THE DRAWINGS

FIGS. 13*a*–13*d* are top views of the planar dispensing rack showing the adjustment rail in varying positions to vary the width of the slot in which the bottles are supported.

DESCRIPTION OF THE PREFERRED EMBODIMENT.

Figure 1:
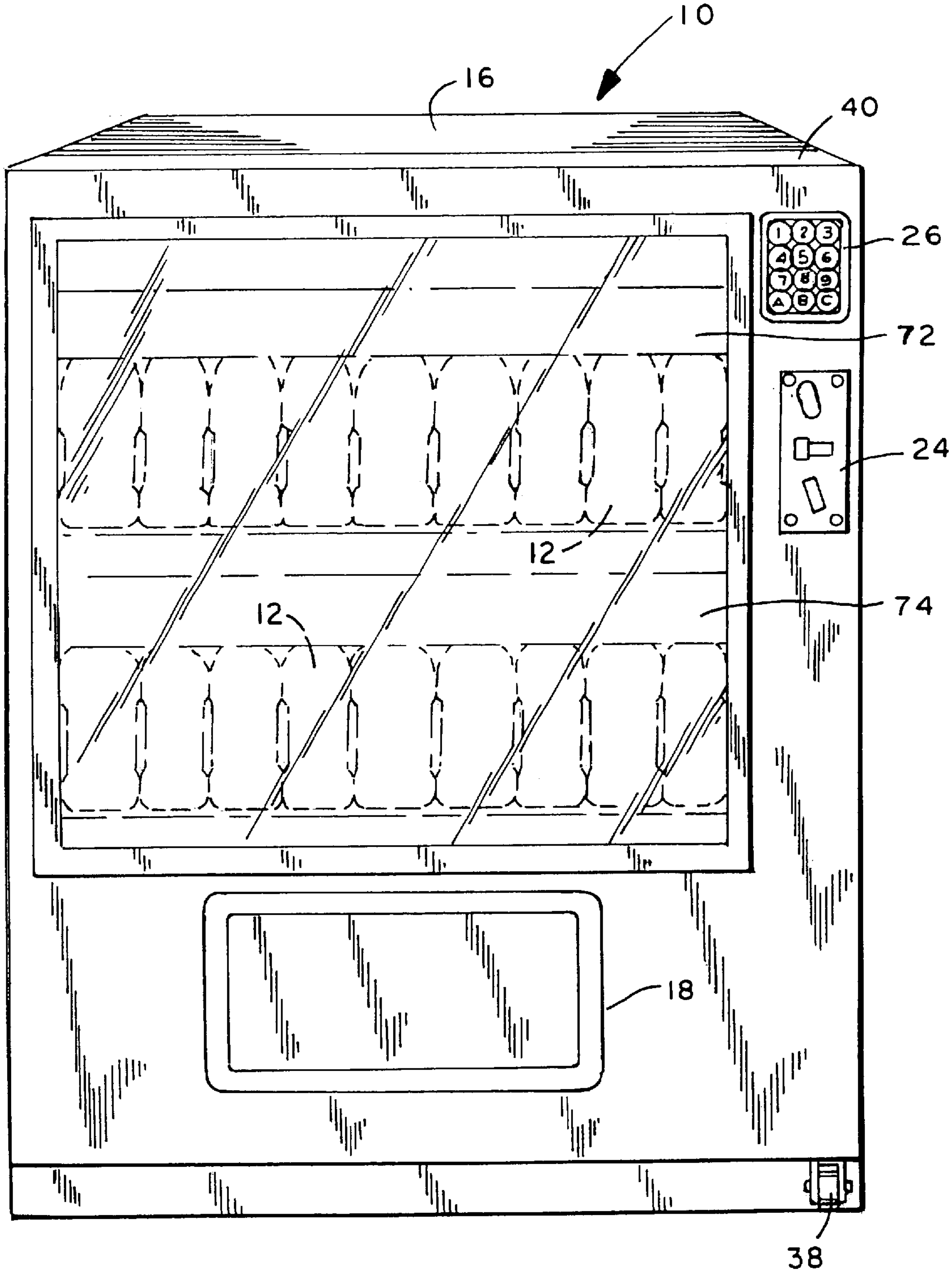
FIG. 1 is a perspective front view of a the vending machine constructed in accordance with the present invention.
Figure 2:
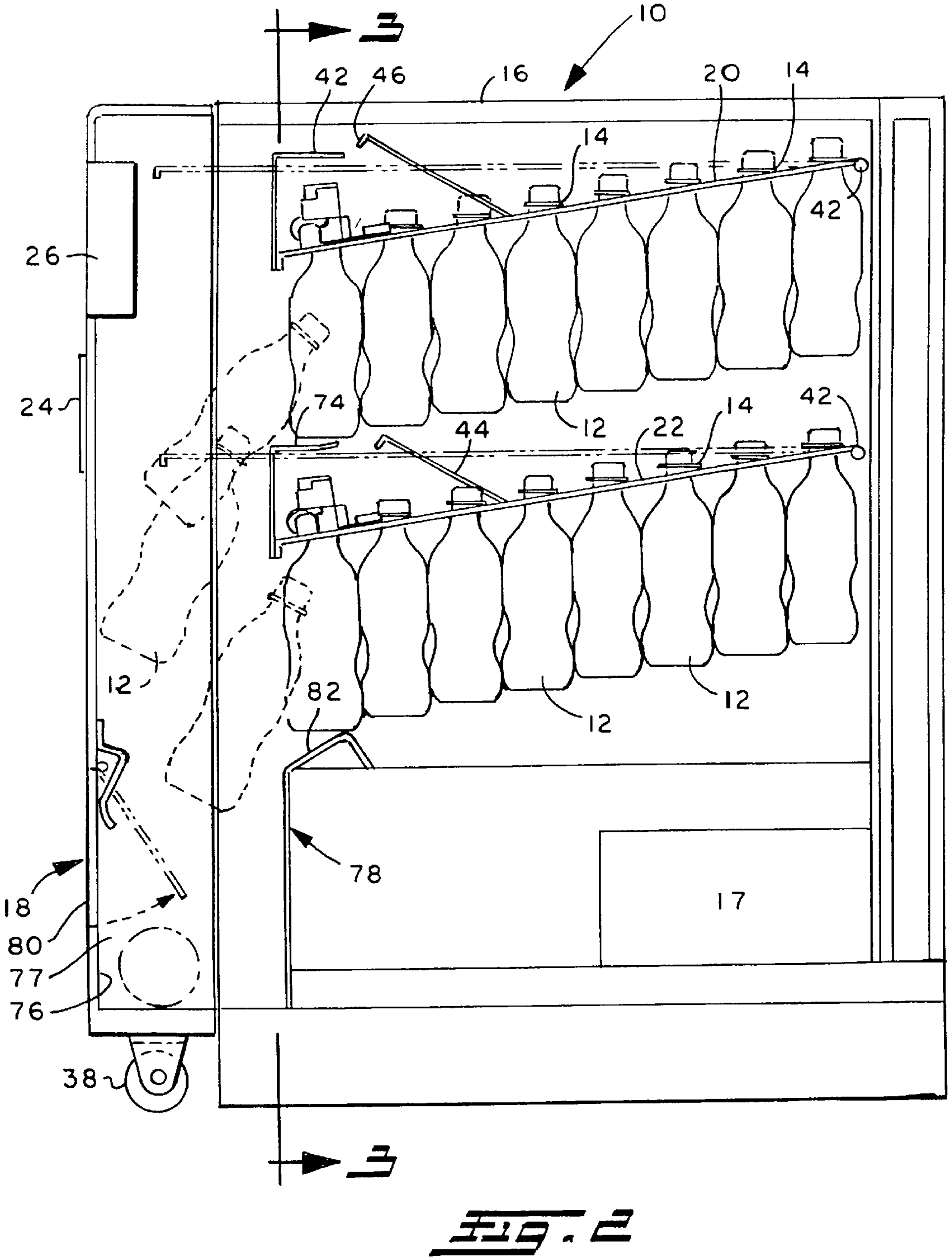
FIG. 2 is a side cross-sectional view of a vending machine constructed in accordance with the present invention, more fully illustrating the dispensing racks and dispensing station.

Referring to the figures and more particularly to FIGS. 1 and 2, a vending machine 10 constructed in accordance with the present invention is illustrated. The vending machine 10 is particularly designed to vend bottles 12 which are supported in an upright position only at a top portion 14 of the bottles and includes a cabinet 16 having a bottle dispensing station 18 disposed therein. A compressor 17 can be located within the storage cabinet 16 to cool the bottles 12 stored therein in a well known manner. When a bottle 12 is to be vended the bottle is moved to the bottle dispensing station 18 where the bottle can be removed from the vending machine 10 by a purchaser. First and second planar dispensing racks 20,22 are located in the storage cabinet 16 for storing a plurality of bottles 12 within the cabinet 16. A coin mechanism 24 is located on the front of the storage cabinet 16 and includes a key pay 26 for selecting a particular selection to be vended from the dispensing racks 20,22 of the vending machine 10. While a coin mechanism 24 is illustrated it should be appreciated that other types of crediting mechanisms such as those that receive credit cards or dollar bills could be used.

The storage cabinet 16 includes a door 40 on the front of cabinet 16 which is pivotable relative to the storage cabinet 16 in a well known manner to allow access to the interior of the vending machine 10. A roller 38 is provided for in part supporting the door 40 when the door 40 is in its open position. The door 40 supports the coin mechanism 24 and defines a portion of the dispensing station 18.

The cabinet door 40 includes a window 74 which when the door is in its closed position is disposed adjacent the front of the dispensing racks 20,22 to allow viewing of the bottles 12 disposed in the slots 30 in the dispensing racks. Each of the selections in the dispensing racks 20,22 will include an associated designation which can be entered into the coin mechanism to select the desired selection.

Figure 4:
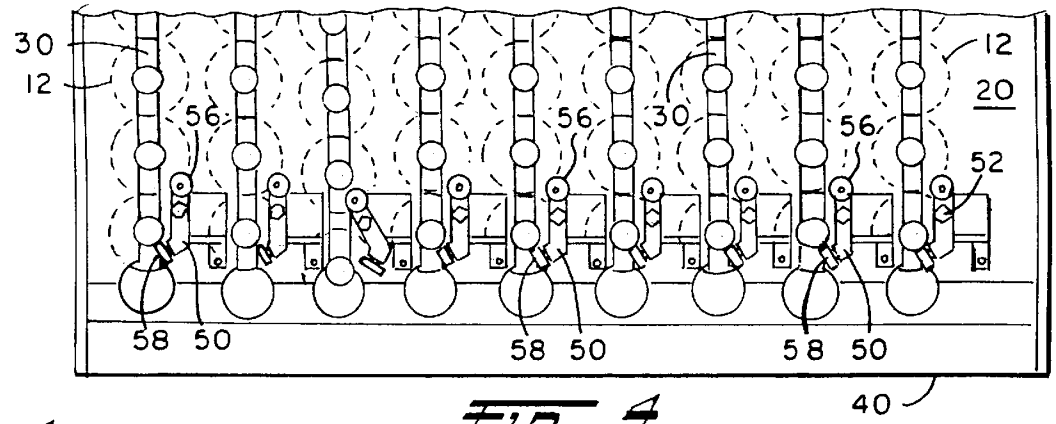
FIG. 4 is a cross-sectional top view taken approximately along lines 4—4 of FIG. 3.
Figure 3:
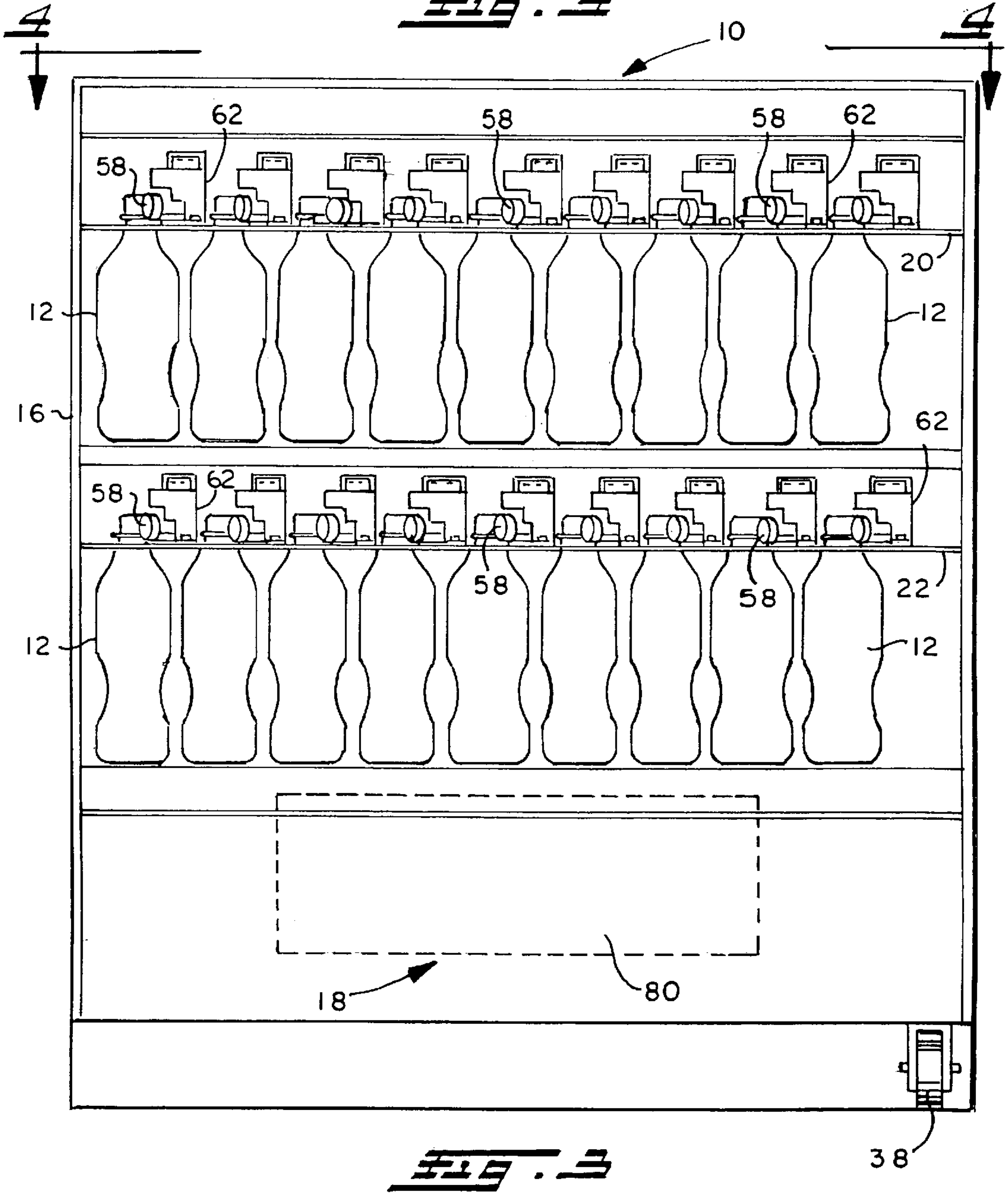
FIG. 3 is a front, partially cross-sectional view of the vending machine of the present invention taken approximately along the lines 3—3 of FIG. 2.

Each of the planar dispensing racks 20,22 is adapted to store a plurality of bottles to be vended therein. While the construction of only one of the planar dispensing racks 22 will be described in detail, it should be appreciated that the construction of planar dispensing racks 20 and 22 is similar. The planar dispensing rack 22, more fully disclosed in FIGS. 4 and 5 includes a plurality of elongated slots 30 for storing and dispensing bottles from the planar dispensing rack 22. The plurality of elongated slots 30 are substantially parallel to each other and each include a pair of spaced apart substantially parallel side walls 32,34 which are spaced apart a distance which is smaller than the diameter of the top portion 14 of the bottles to be supported in the planar dispensing rack 22. The side walls 32,34 of each of the slots 30 terminate at one end in an opening 36 which has a diameter which is larger than the top portion 14 of the bottles 12 which are supported in the elongated slots 30. While opening 36 is illustrated as a circular opening 36, it should be appreciated that the opening 36 does not have to be a continuous circular opening and could have a construction in which the side wall 32,34 diverge away from each other as is illustrated in phantom lines at 36a in FIG. 5. Each of the planar dispensing racks 20, 22 can, in the preferred embodiment, be easily and inexpensively formed from sheet metal.

As is more fully illustrated in FIG. 2, each of the bottles 12 includes a top portion 14 which has a diameter which is larger than the distance between the spaced apart side walls 32,34 of each of the slots 30. The top portion 14 of the bottle 12 can include a ridge or protrubance on the bottle or may include a portion of the cap of the bottle 12. However, it is important that the diameter of the top portion 14 be greater than the diameter of slot 30. The top portion 14 of each of the bottles 12 slides on the top surface of the planar dispensing rack adjacent to the side walls 32,33. In the present embodiment, the width of the slots 30 is approximately 1.075 inches which allow the slots to accommodate 12, 16 and 20 ounce glass or plastic bottles.

The top portion 14 of each of the bottles 12 is adapted to support the bottles 12 in the slots 30. The top portion 14 engages and slides on the top portion of the planar dispensing racks adjacent to the side walls 32,34 of slots 20,22. Each of the planar dispensing racks 20,22 is inclined, in the preferred embodiment, approximately 15 degrees from horizontal in a downwardly direction toward the openings 36 located at one end of the slots 30 as is illustrated in FIG. 2. When a plurality of bottles 12 are located in the elongated slots 30 the bottles slide solely under the influence of gravity toward the one end of the dispensing rack at which the openings 36 are located. As is illustrated in FIG. 2, the bottles have a generally vertical orientation as they slide through the slots 30 in the planar dispensing racks 20,22 toward openings 36.

The rear portion of each of the planar storage racks 20,22 is supported on a pair of pivot pins 42, one of which is illustrated in FIG. 2, to allow each of the planar dispensing racks 20,22 to move from its full line position illustrated in FIG. 2 in which the planar dispensing racks 20,22 are inclined, to its phantom line position illustrated in FIG. 2 in which the planar dispensing racks 20,22 have a generally horizontal orientation and extend about four inches out of the front of cabinet 16 to facilitate loading of racks 20 & 22. Tracks 44 are disposed in the side walls of the storage cabinet 16 and accommodate a roller means, not illustrated, which is attached to the planar dispensing racks 20,22 and which slides in track 44 when the planar dispensing racks 20,22 are pivoted from their inclined position to their horizontal position. The pivot pins 42 are each located in a horizontal slot, not illustrated, which allows the back of each of the racks 20,22 to move toward the front of cabinet 16 while the front of each of the racks 20,22 are lifted upwardly and moved forward in tracks 44. The racks 20,22 are moveable to a horizontal position to facilitate loading of the dispensing racks 20,22 with bottles 12 to be vended when the door 40 is opened and the vending machine is serviced. A suitable dog 46 can be located at one end of each of the tracks 44 to support the dispensing racks 20,22 in a substantially horizontal position while the racks are loaded with bottles to be vended. While only one track 44 is illustrated associated with each of the planar dispensing racks 20,22 it should be appreciated that a track 44 can be located on each side wall of the cabinet 16 to support each side of the dispensing racks 20,22. Additionally, if desired a door, not illustrated, can be provided in the rear of cabinet 16 to load the racks 20,22 from the rear while the racks are located in an inclined position. If a door is located in the rear of the cabinet 16 for loading racks 20,22, the slots 30 can be modified to allow bottles 12 to be loaded into the rear of each slot 30.

A plurality of gating members 50 are each pivotally supported about a pivot pin 52 on each of the dispensing racks 20,22. Each of the gating members 50 is disposed adjacent to one of the slots 30 at the juncture of the slot 30 and the opening 36 for controlling sliding movement of the bottles 12 through the slot 30 into the opening 36. The gating member 50 includes a pair of arms 54,56 which extend in opposite directions from the pivot pin 52 for engaging with the bottles 12 to control the movement of the bottles through the slot 30 to the opening 36. A roller 58 is located on the end of arm 54 and a roller 60 is located on the end of arm 56. The rollers 58 and 60 engage with the top portions 14 of the bottles 12 as will be more fully described herein below to control movement of the bottles 12 through slot 30 and into the opening 36.

The gate member 50 is pivotable about the shaft 52 which is supported in an opening, not illustrated, in the dispensing rack. The shaft 52 about which gate member 50 pivots is disposed substantially perpendicular to the gate member 50 and allows the gate member to pivot in both a clockwise and counterclockwise direction as is viewed in FIGS. 4 and 8. The gate member 50 has a blocking position illustrated in FIG. 8*a* wherein the roller 58 engages with the next bottle 12 to be vended and prevents movement of the next bottle to be vended from the slot 30 into the opening 36. The gate member 50 is operable to rotate in a counterclockwise direction from its blocking position illustrated in FIG. 8*a* to a dispensing position illustrated in FIG. 8*c*. When the gate member 50 is in its dispensing position the gate member is rotated by movement of the next bottle 12 to be vended through the slot 30 and allows the next bottle to be vended to move into opening 36 and the bottle 12 drops through opening 36 to the dispensing station 18.

Figure 6:
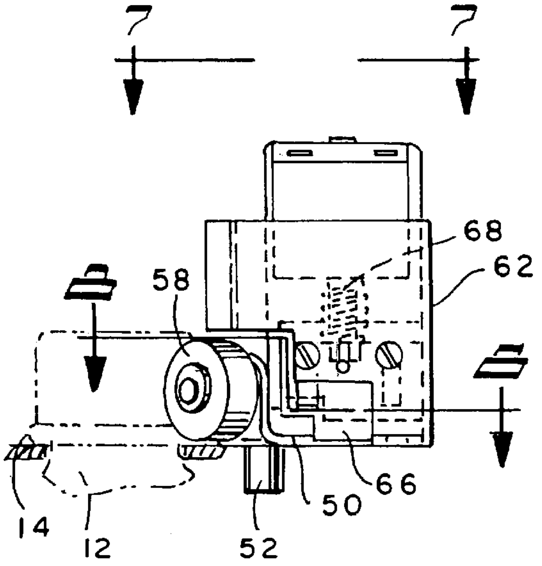
FIG. 6 is a front view more fully illustrating the locking mechanism and gating member.
Figure 7:
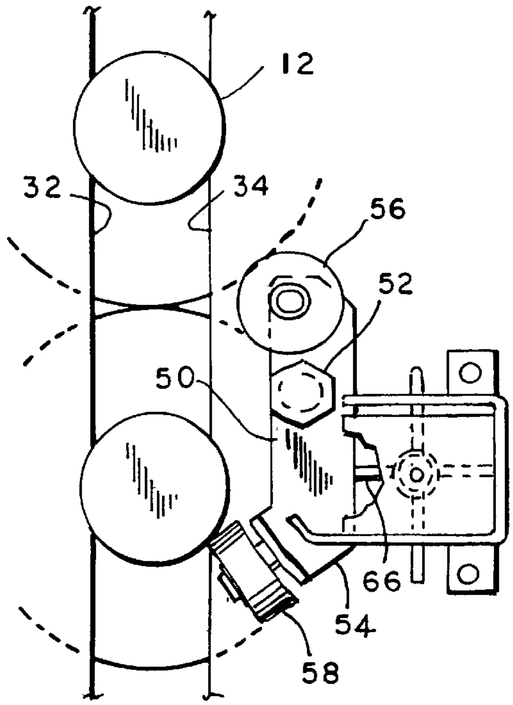
FIG. 7 is a top view taken approximately along the lines 7—7 of FIG. 6 illustrating the locking mechanism in its unactuated position in which the locking member engages the gate member to prevent rotation of the gate member in a counterclockwise direction as viewed in FIG. 7.
Figure 8A:
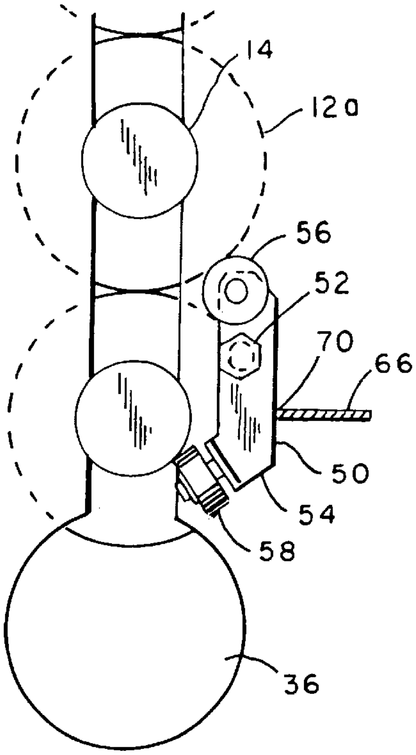
FIGS. 8*a*–8*e* are fragmentary top views taken approximately along lines 9—9 of FIG. 6 more fully illustrating the sequential movement of the gating members as the bottles are sequentially moved in the upper dispensing rack from the slots to the openings.
Figure 8B:
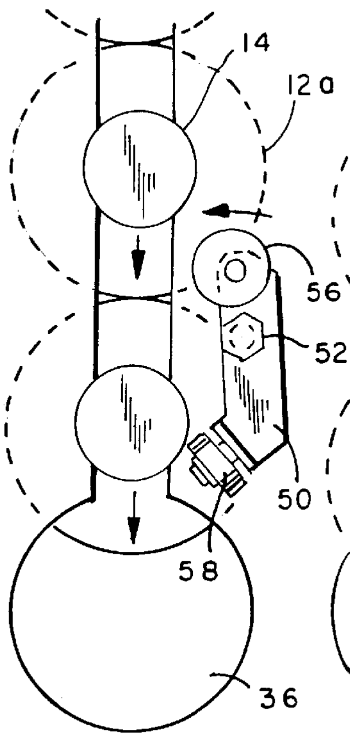
Figure 8C:
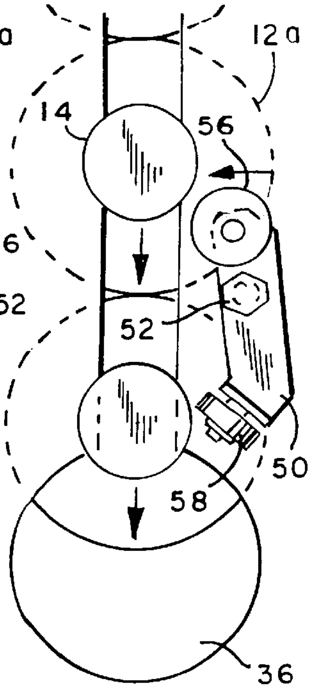

A locking mechanism 62 including a solenoid 64 and a locking member 66 is disposed adjacent each gating member 50 for locking its associated gating member 50 in its blocking position illustrated at FIG. 8*a*. The locking mechanism more fully illustrated in FIGS. 6 and 7 includes a spring biased plunger 68 which is connected to the locking member 66 and which normally biases the locking member 66 in a downwardly direction to its position illustrated in FIG. 6. In this position, the locking member 66 is operable to engage with an edge 70 of the gate member 50 when the gate member 50 is in its blocking position illustrated in FIG. 8*a* to prevent rotation of the gating member 50 in a counterclockwise position.

Figure 8D:
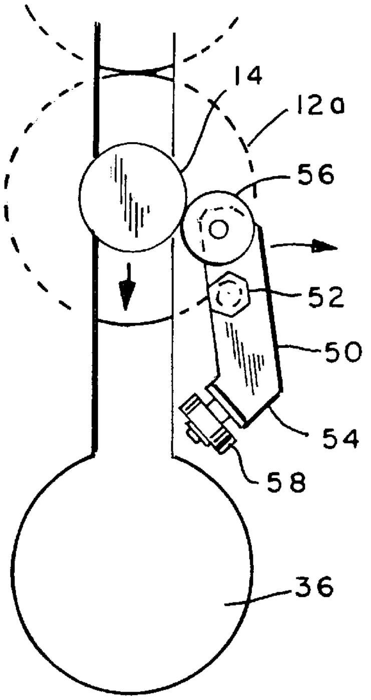
Figure 8E:
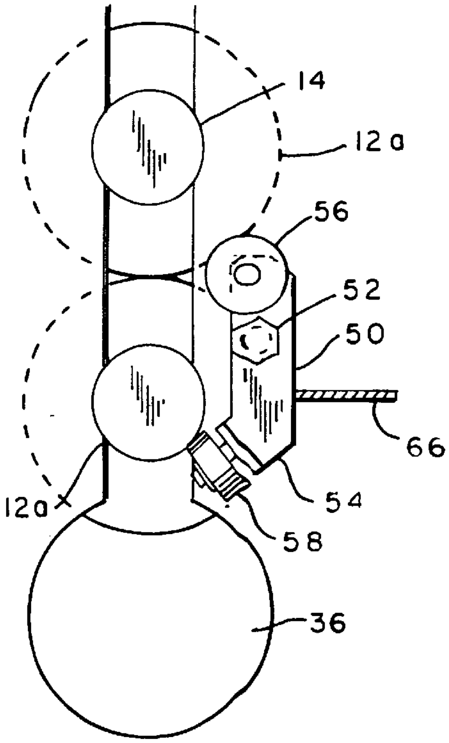

Each of the slots 30 in the dispensing racks 20,22 may have a different selection of bottles to be vended. For example, one slot 30 may hold bottles of water, another orange juice and still another soda pop. These selections are viewed through the window in door 40 and preferably each slot is labeled with a number. When coins of a predetermined value are deposited in the coin mechanism 24 a particular selection is chosen by entering the number associated with the selection in the key pad 26. The coin mechanism 24 then energizes the solenoid 64 associated with the selected bottle to be vended. Energization of the solenoid 64 moves the locking member 66 in a upwardly direction as is viewed in FIG. 6 to disengage the locking member 66 from the gating member 50 to unlock the gating member 50. The bottles 12 to be vended in slot 30 then start to slide under the influence of gravity due to the fact that the dispensing rack in inclined. The next bottle to be vended engages with roller 58 and rotates the now unlocked gating member 50 in a counterclockwise direction about pivot pin 52 from its blocking position illustrated in FIG. 8*a* to its position illustrated in FIG. 8*b* and to its dispensing position illustrated in FIG. 8*c* at which time the bottle 12 to be vended has slid from slot 30 to opening 36 where the bottle 12 drops through opening 36 to the dispensing station 18 as is illustrated in FIG. 2. After the next bottle to be vended drops through opening 36, roller 60 on arm 56 of the gating member 50 engages with the top portion 14 of the new next bottle 12*a* to be vended as the bottle 12*a* slides through slot 30. As the new next bottle 12*a* to be vended engages with roller 60, as is illustrated in FIG. 8*d*, the new next bottle 12*a* to be vended biases the gating member 50 in a clockwise direction about pivot shaft 52. The new next bottle 12*a* to be vended continues to rotate gating member 50 in a clockwise direction toward gate member 50's blocking position illustrated in FIG. 8e and FIG. 8*a* in which gating member 50 blocks movement of the new next bottle 12*a* to be vended from the slot 30 to the opening 36.

The locking mechanism 62 does not move gating member 50. The locking mechanism 62 is operable to engage with gating member 50 to lock the gating member 50 in its blocking position. Clockwise and counterclockwise rotation of the gating member 50 is occasioned solely by the bottles 12 sliding through slot 30 under the influence of gravity and engaging with the rollers 58 and 60 supported on arms 54 and 56, respectively, of the gating member 50. While rollers 58 and 60 have been disclosed as positioned on the end of the arms 54 and 56 of the gate member, it should be appreciated that gate member 50 could be formed with the rollers 58 and 60 as an integral portion of the gate member 50. For example, the gate member 50 could be formed as one piece molded member having integrally formed curved surfaces instead of rollers 58 and 60, which curved surfaces would engage with the top portion 14 of the bottles 12 to meter movement of the bottles from the slot 30 to opening 36 (see FIG. 10). The curved surfaces on rollers 58 and 60 facilitates the pivoting movement of the gate member 50 by the top portions 14 of the bottles as the bottles move through the slot 30 relative to the gate member 50.

When a bottle 12 is released from the planar dispensing rack 20, the bottle 12 drops from opening 36 to the dispensing station 18 which includes a chamber 77 formed by an inner portion 76 of the door 40 and a sheet metal member 78 in the main cabinet 16 which cooperate to define a chamber 77 into which the bottle 12 may drop when the bottle moves to the dispensing station 18. A deflector member 74 is mounted on the lower planar dispensing rack 22 to engage with the bottles falling from the upper planar dispensing rack 20 to guide bottles 12 falling from the upper dispensing rack 20 to the dispensing station 18. A deflecting member 82 is provided beneath the planar dispensing rack 22 to deflect bottles falling therefrom to the dispensing station 18. Each of the deflecting member 74 and 82 include surfaces thereon which are operable to engage with the bottles 12 as illustrated in FIG. 2 when the bottles 12 drop through the openings 36 in the dispensing racks and deflect the bottles 12 toward the dispensing station 18. When the bottles 12 drop from either of the dispensing racks 20,22 the bottles 12 are deflected to the left as is viewed in FIG. 2 and drop into chamber 77 at the dispensing station 18. The dispensing station 18 includes a push door 80 which can be pushed opened to allow a user to remove any dispensed bottles 12 from the chamber 77 at the dispensing station 18.

From the foregoing it should be apparent that a new and improved vending machine 10 for vending a plurality of bottles 12 which are supported in an upright position only at a top portion 14 of the bottles 12 has been illustrated. The vending machine 10 includes a storage cabinet 16 including a dispensing station 18 from which bottles 12 may be removed from the storage cabinet 16. A first planar dispensing rack 20 is located in the storage cabinet 16 and includes a plurality of substantially parallel elongated slots 30 located therein for storing bottles and dispensing bottles from the dispensing rack 20. Each of the bottles 12 includes a top portion 14 which is engaged by and supported by the slots 30 in the dispensing rack 20. Each of the plurality of slots includes a pair of substantially parallel spaced apart side walls 32,34 which terminate at one end thereof in an opening 36. The pair of substantially parallel spaced apart side walls are spaced apart a distance which is less than the diameter of the top portion 14 of the bottles 12 which are supported in the elongated slots to prevent the bottles 12 from falling from the elongated slots when bottles are supported by the sides walls 32,34 of the slots 30. Each of the openings 36 at one end of the slots 30 have a diameter which is larger than the diameter of the bottle portion 14 supported in the elongated slot to enable bottles which move from the slots 30 to the openings 36 to fall from the openings 36 in the dispensing rack 20 to the dispensing station 18. The planar dispensing rack 20 is inclined from a horizontal position in a downwardly direction toward the openings 36 at one of the plurality of slots 30 to enable bottles 12 supported in each of the plurality of slots 30 to move under the influence of gravity toward the one end of the slots 30 at which the opening 36 is located. A plurality of gate members 50 are provided, one of which is associated with each of the slots 30, for controlling movement of the bottles 12 in the associated slot from the slot 30 to the opening 36 at one end thereof. A plurality of locking mechanisms 62 are provided, one of which is associated with each of the gate members 50, for locking movement of the gate member in a blocking position in which the gating member 50 blocks movement of bottles 12 through its associated slot 30 to the opening 36. A coin mechanism 24 is provided for actuating a selected locking mechanism 62 to allow movement of the associated gate member 50 from its blocking position to a dispensing position in which the next bottle 12 to be vended engages with the gating member to rotate the gating member as the bottle 12 moves from the slot to the opening 36 and drops to the dispensing station 18.

A method is also disclosed for vending bottles from a bottle vending machine in which a plurality of bottles are supported at a top portion 14 of the bottles in a slot 30 in an inclined dispensing rack 20 using a pivotable gating member 50 which is selectively engageable with a locking member 66 to prevent pivotable movement of the gating member 50 to control the sequential movement of bottles 12 to be vended through the slot 30 in the inclined dispensing rack 20 under the influence of gravity. The method includes the steps of providing a slot 30 in an inclined dispensing rack 20 for supporting the top portion 14 of bottles 12 therein which includes an opening 36 at one end through which the top portion of a bottle 14 can pass when a bottle is dispensed from the slot 30 in the dispensing rack; supporting in a top portion thereof a plurality of bottles 12 to be vended in the slot 30 in the inclined dispensing rack 20 which move under the influence of gravity through the slot 30 toward the one end at which the opening 36 is located; locating the pivotable gating member 50 adjacent the slot 30 to control movement of the bottles through the slot 30 to the opening 36 at the one end of the slot; engaging the locking member 66 with the gating member 50 to lock the gating member in a first position in which a first portion of the gating member engages with the top portion of the next bottle to be vended in the slot 30 to block movement of the next bottle to be vended to the opening 36 at one end of the slot 30; disengaging the locking member 66 from the gating member 50 to unlock the gating member and allow the gating member to pivot in a first direction to a second position under the influence of the top portion 14 of the next bottle 12 to be vended as the next bottle 12 to be vended slides under the influence of gravity in a downwardly direction through the slot 310 to the opening 36 at the one end thereof; disengaging the next bottle 12 to be vended from the first portion 58 of the gating member 50 when the gating member 50 is in its second position and the next bottle to be vended drops from the slot 30 through the opening 36; engaging a new next bottle to be vended **12*a* with a second portion 60 of the gating member 50 to pivot the gating member back to its first blocking position in a second direction, opposite the first direction, as the new next bottle to be vended 12*a* slides under the influence of gravity in a downwardly direction through the slot 30 toward the opening 36; disengaging the new next bottle 12*a* to be vended from the second portion 60 of the gating member 50 when the gating member 50 is in its first position and then engaging the new next bottle to be vended with the first portion 58 of the gating member 50 to bias the gating member 50 in the first direction; and engaging the locking member with gating member 50 to prevent the new next bottle 12*a* to be vended from pivoting the gating member 50 in the first direction and for locking the gating member 50 in its first position in which it blocks movement of the next bottle to be vended from the slot 30 to the opening 36**.

A further embodiment of the invention is disclosed in FIGS. 9–13 which discloses a planar storage rack 20 including an elongated slot 30 which is adjustable in width to accommodate bottles having various diameters at the top portion thereof. Like numerals have been used to denote identical or substantially Identical parts as described in FIGS. 1–8. While only a single slot 30 has been illustrated for simplicity, multiple slots 30 could be disposed in the planar storage rack 20. As is more fully disclosed in FIG. 11, an elongate planar sheet metal member or adjustment rail 90 is provided for adjusting the width of the slot 30 in the planar dispensing rack 20. The sheet metal member 90 which extends along the length of the elongated slot 30 is fastened to the planar dispensing rack 20 by a plurality of fasteners 92, a nut and bolt in the preferred embodiment, which extend through openings 94, 96 located in the adjustment rail 90 and through openings 100, 102, or 104 in the planar dispensing rack 20. When the adjustment rail 90 is secured to the planar dispensing rack 20 by fasteners 92, the width of the slot 30 is fixed.

The adjustment rail 90 includes two pairs of openings 94 and 96 and the planar dispensing rack 20 includes three pairs of openings 100, 102, and 104. Each of the pairs of openings are aligned with the longitudinal axis of the elongated slot 30. By aligning the openings 94 and 96 in the adjustment rail 90, with various openings 100, 102, and 104 in the planar dispensing rack 20, the adjustment rail 90 can be adjusted to vary the width of the slot 30 to accommodate bottles having various widths. For example, in FIG. 13*a*, the fasteners 92 are disposed in the pair of openings 94 in the adjustment rail 90 and the pair of openings 100 in the planar dispensing rack 20 to establish the width of slot 30 at a first diameter which would accommodate, in the present embodiment, common 12, 16, and 20 oz. plastic bottles known as "pet bottles". In this position, the width of slot 30 is approximately 1.085 inches. In FIG. 13*b*, the adjustment rail 90 is illustrated in a position in which the fasteners 92 are positioned through the pair of openings 96 in the adjustment rail 90 and the pair of openings 102 in the planar dispensing rack 20 to fix the width of the slot 30 at a second diameter to accommodate bottles having a second diameter at the top portion thereof. In this position, the width of slot 30 is approximately 1.200 inches. In the embodiment shown in FIG. 13*b*, the width of the slot 30 will generally accommodate juice bottles. In FIG. 13*c*, the adjustment rail 90 is illustrated in a third position in which the fasteners 92 are disposed through the pair of openings 96 in the adjustment rail 90 and the pair of openings 104 in the planar dispensing rack 20 to fix the diameter of the slot 30 at a third predetermined diameter in which the slot 30 has a width which will accommodate 16 oz. glass bottles. In this position, the width of slot 30 is approximately 1.385 inches. FIG. 13*d* illustrates the width of the slot 30 when the adjustment rail 90 is removed and the slot 30 has its maximum width in which wide mouth bottles can be accommodated in the planar dispensing rack 20. In this position, the width of the slot 30 is approximately 1.635 inches and accommodates plastic 20 oz. wide mouth bottles.

While openings or holes 94, 96, 100, 102, and 104 have been illustrated in the preferred embodiment of the invention to adjust the width of slot 30 by adjusting the position of member 90, it should be appreciated that various other means could be utilized to adjust the width of the slots 30. For example, instead of holes 94, 96, various configurations of slots could be located in the adjustment rail 90 to allow movement of the adjustment rail 90 relative to the planar dispensing rack 30 when the fasteners 92 are loosened. The adjustment rail 90 would then be moved relative to dispensing rack 20 to the desired position and the fasteners 92 tightened when the width of the slot 30 was at the correct width. In addition, while the adjustment rail 90 and planar adjusting rack 20 have been illustrated as being formed from sheet metal, other constructions such as adjustable rods or rails could be utilized to define the slots 30 in a planar dispensing rack 20.

Figure 9:
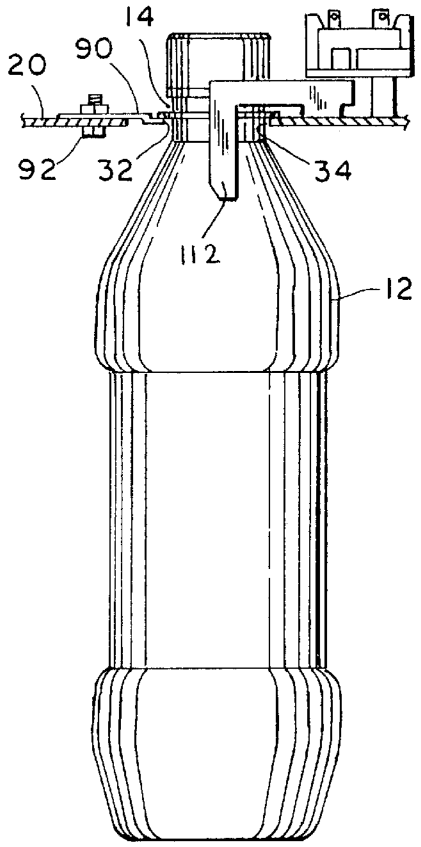
FIG. 9 is a front partially cross-sectional view of an alternate embodiment of the invention.
Figure 10:
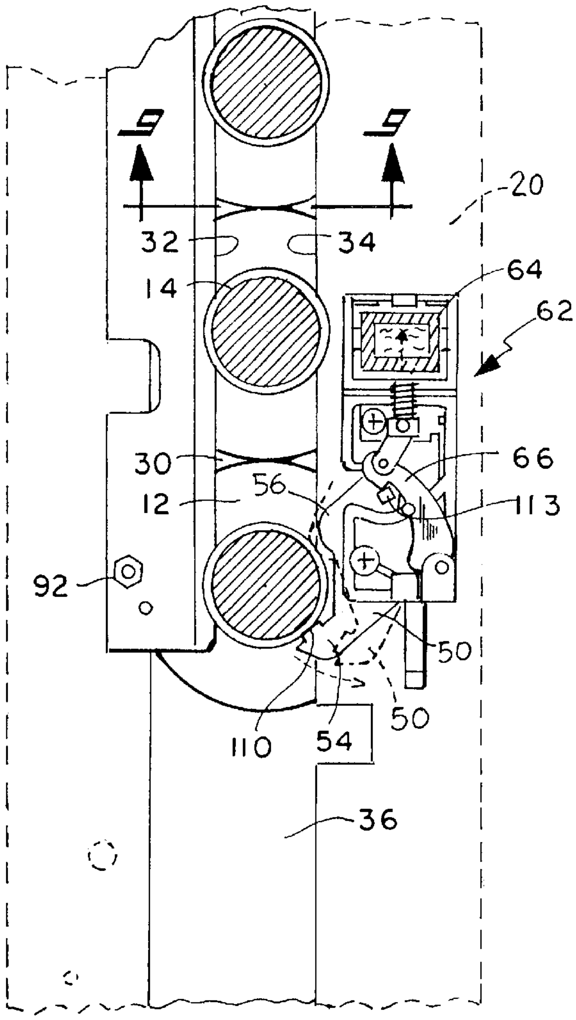
FIG. 10 is a top view of FIG. 9 illustrating the locking mechanism in its unactuated position in which the locking member engages the gate member to prevent rotation of the gate member from its blocking position illustrated in full lines in a counterclockwise direction as viewed in FIG. 10 to its dispensing position illustrated in phantom lines.
Figure 11:
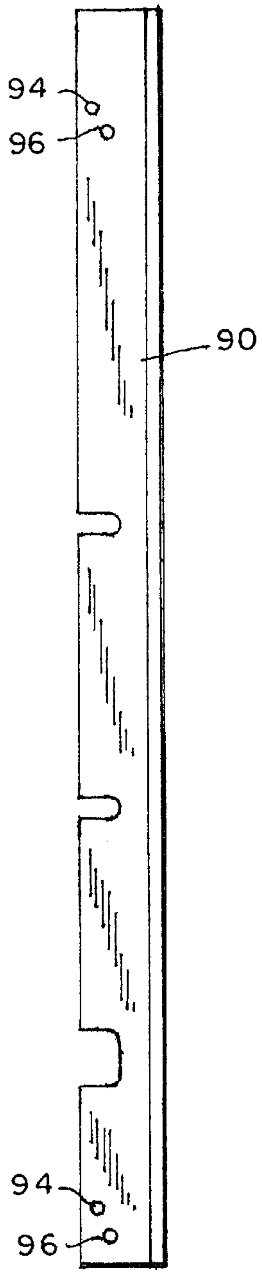
FIG. 11 is a top view of the planar adjusting rail utilized in the alternate embodiment of the invention to adjust the width of the slot in which the bottles are supported.
Figure 12:
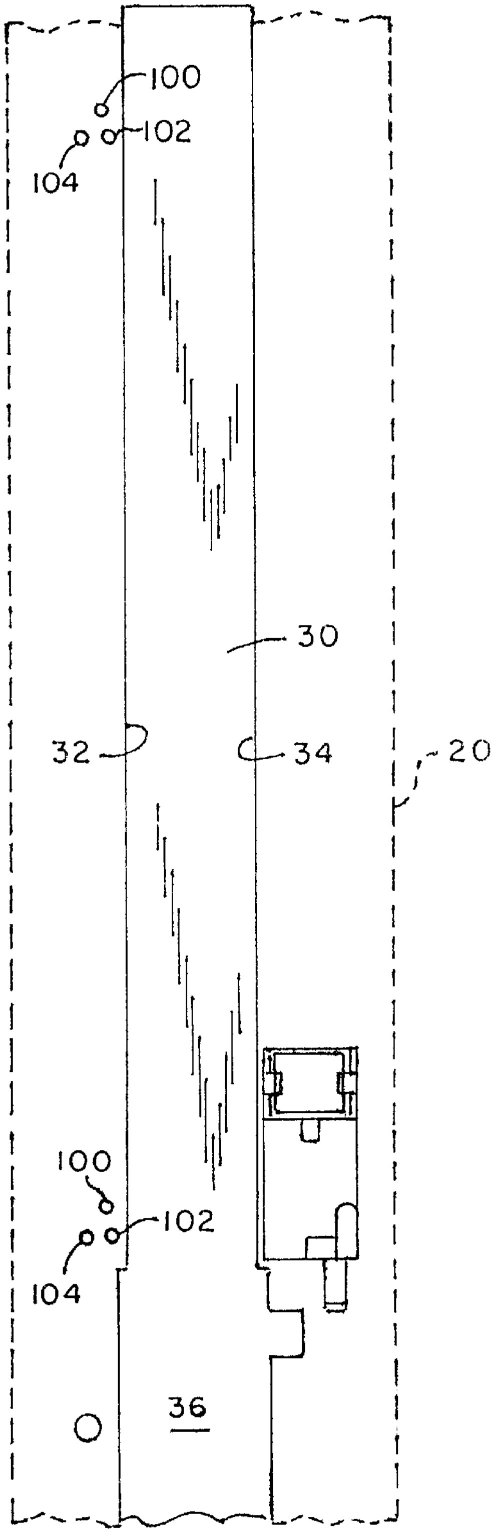
FIG. 12 is a top view of an alternate embodiment of the planar dispensing rack which is adapted to have the planar dispensing rail disposed thereon to vary the width of the slot in which the bottles are supported.

A gating member 50 may be provided adjacent the slot 30 to dispense bottles from the slot 30 as has been previously described herein. The gate member 50 illustrated in FIGS. 9 and 10 is slightly modified from the gate member 50 disclosed in FIGS. 1–9, but works in a similar fashion to dispense bottles 12 from the slot 30. The gate member 50 is operable to rotate in a counterclockwise direction from a blocking position, illustrated in full lines in FIG. 10, to a dispensing position, illustrated in phantom lines in FIG. 10, in which the next bottle to be vended moves through the slot 30 and moves into the opening 36 wherein the bottle 12 drops through the opening to the dispensing station 18. The gate member 50 is supported to rotate about a pivot pin, not illustrated, for controlling sliding movement of the bottles 12 through the slot 30 into the opening 36. The gating member 50 includes a pair of arms 54, 56 which extend in opposite directions from the pivot pin for engaging with bottles 12 to control the movement of the bottles through the slot 30 to the opening 36. A stop member 110 and arm 112 are located on the end of the arm 54. The stop member 110 engages with the top portion 14 of the next bottle to be vended and the arm 112 also engages with the bottle 12 to prevent movement of the bottle 12 from the slot 30 to the opening 36 when the gate member 50 is in its blocking position as is illustrated in FIGS. 9 and 10. The arm 112 also prevents the bottle 12 from skewing in slot 30.

The gate member 50 is pivotable about the pivot pin which is supported in the dispensing rack. The gate member 50 has a blocking position illustrated in full lines in FIG. 10 wherein the stop member 110 and arm 112 engage with the next bottle 12 to be vended and prevent movement of the next bottle to be vended in the slot into the opening 36. The gate member 50 is operable to rotate in a counterclockwise direction from its blocking position illustrated in full lines in FIG. 10 to a dispensing position illustrated in phantom lines in FIG. 10. When the gate member 50 is in its dispensing position, the gate member 50 is rotated by movement of the next bottle 12 to be vended through the slot 30 and allows the next bottle to be vended to move into the opening 36 and the bottle 12 drops through the opening to the dispensing station 18.

A locking mechanism 62 includes the solenoid 64 and the locking member 66 which is operable to engage with a locking pin 113 disposed on the gate member 50. The locking pin 113 engages with the locking member 66 when the solenoid 64 is not energized to prevent rotation of the gate member 50. When the solenoid 64 is energized, the solenoid armature retracts and the locking member 66 moves in a upwardly direction as is viewed in FIG. 10 toward solenoid 64, to disengage from the locking pin 113 disposed on the gate member 50. When the locking member 66 disengages from the pin 113, the gate member 50 rotates in a counterclockwise direction about pin 52 from its full line position illustrated in FIG. 10 to its phantom line position illustrated in FIG. 10 as the next bottle to be vended slides in slot 30 toward opening 36. Counterclockwise rotation of the gate member 50 dispenses a single bottle 12 from the slot 30 as has been described herein above. A crediting or coin mechanism as has been described herein above can be connected to operate the locking mechanism 62.

Figure 5:
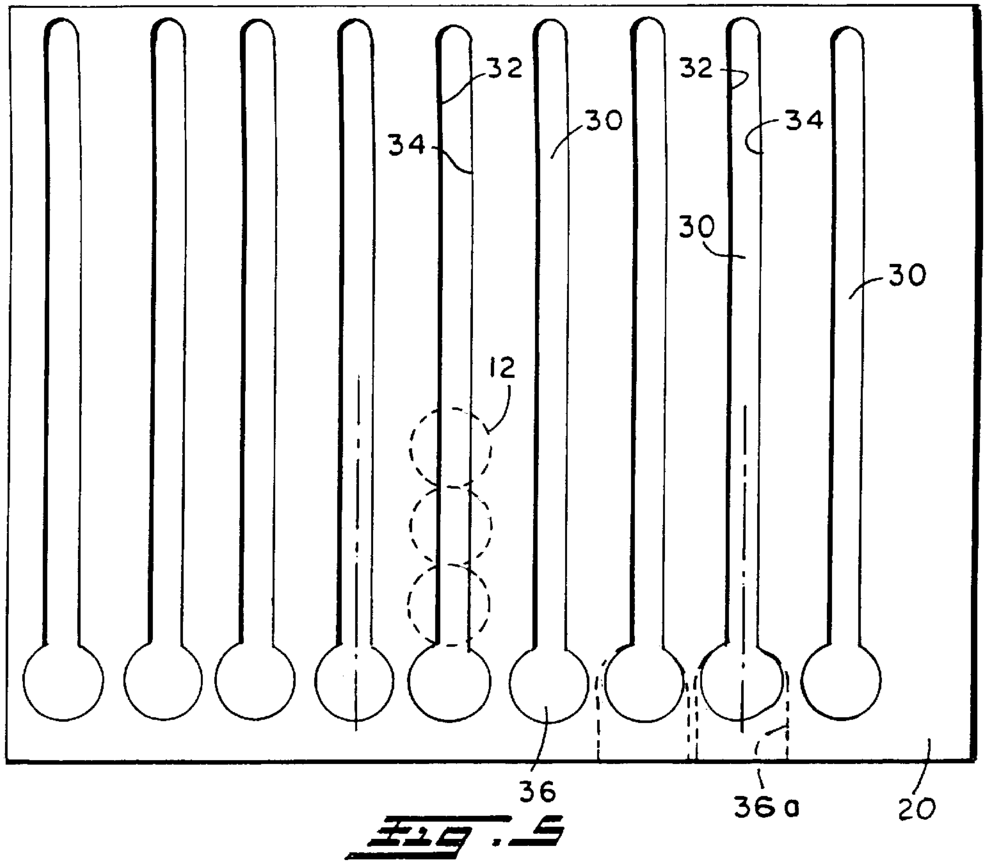
FIG. 5 is a top view of the dispensing rack more fully illustrating the construction of the slots and openings disposed at one end thereof.

While opening 36 is illustrated in FIG. 10 as having a relative rectangular configuration, it should be appreciated that the opening 36 does not have to be a continuous opening and could have a construction in which the side walls 32, 34 diverge away from each other as is illustrated in phantom lines at 36a in FIG. 5.

Additionally, while the gate member 50 has been described as being under control of a locking mechanism 62 and a crediting or coin mechanism for unlocking the locking mechanism 62, the use of the adjustable width slots 30 to support bottles 12 at a top portion 14 thereof could also be utilized in a merchandising machine wherein no coin mechanism or locking mechanism is provided. In such a merchandiser, the gate member could be similar to gate member 50 or could be a simple spring biased non-pivoting gate such as utilized in the prior art "Neck-Glide" system sold by H & S Beverage Merchandising in Englewood, New Jersey or the "Nektracker" sold by Mead in Atlanta, Ga., which would be spring biased to block the next bottle in the slot 30 from moving toward the opening 36 thereby supporting the next bottle 12 to be vended at the end of the slot 30 adjacent the gate member. When it is desired to dispense a bottle 12, a user could grasp a bottle and forcible move the bottle 12 past the biased gate mechanism which would be resiliently biased toward its blocking position. When the bottle is moved past the gate member, the bottle can then be removed from the slot through the opening 36 and the gate member would move back to its blocking position due to the biasing mechanism.

From the foregoing, it should be apparent that a new and improved vending machine 10 for vending a plurality of bottles 12 each of which is supported in an upright position only at the top portion 14 of each of the bottles 12 has been disclosed. The vending 10 machine includes a storage cabinet 16, a dispensing rack 20 located in the storage cabinet 16 having at least a single elongated slot 30 located therein for storing and dispensing bottles 12 from the dispensing rack 20. The bottles 12 each include a top portion 14 which is engaged by and supported by the slot in the dispensing rack 20. The slot 30 includes a pair of substantially parallel spaced apart side walls 32, 34 which terminate at one end thereof in an opening 36 in the dispensing rack 20. The pair of substantially parallel spaced apart side walls are spaced apart a distance which is less than the diameter of the top portion 14 of the bottles 12 which are supported in the elongate slot 30 to prevent bottles from falling from the elongated slot 30 when bottles are supported by the side walls of the slot 30. An adjustment rail 90, fastener means 92 and openings 94, 96, 100, 102, and 104 are provided for adjusting the distance between the parallel spaced apart side walls 32, 34 to enable the slot 30 to support bottles 12 having various diameters at the top portion 14 of the bottles. The opening 36 in the dispensing rack is larger than the diameter of the top portion 14 of the bottles 12 which are supported in the elongated slot to enable bottles which are supported in the elongated slot to move from the slot into the opening to be removed from the dispensing rack. The dispensing rack 20 in lined from a horizontal position in a downwardly direction toward the opening 36 to enable bottles supported in the slot 30 to move under the influence of gravity toward the one end of the slot 30 at which the opening 36 is located. A gate member 50 is provided for controlling movement of the bottles 12 through the slot 30 to the opening 36. Additionally, the use of the adjustment rail 90 to accommodate various diameter bottles in the slot 30 in a merchandising machine has also been disclosed.

What I claim is:

1. A vending machine for vending a plurality of bottles each of which are supported in an upright position only at a top portion of each of the bottles comprising a storage cabinet, a dispensing rack located in said storage cabinet having at least a single elongated slot located therein for storing and dispensing bottles from said dispensing rack which bottles each include a top portion which is engaged by and supported by said slot in said dispensing rack, said slot including a pair of substantially parallel spaced apart side walls which terminate at one end thereof in an opening in said dispensing rack, said pair of substantially parallel spaced apart side walls being spaced apart a distance which is less than the diameter of the top portion of the bottles which are supported in said elongated slot to prevent bottles from falling from said elongated slot when the bottles are supported by said side walls of said slot, means for adjusting the distance between said parallel spaced apart side walls of said slot to enable said slot to support bottles having various diameters at the top portion of the bottles, said opening in said dispensing rack being larger than the diameter of the top portion of the bottles which are supported in said elongated slot to enable bottles which are supported in said elongated slot to move from said slot into said opening to be dispensed from said dispensing rack, said dispensing rack being inclined from a horizontal position in a downwardly direction toward said opening in said dispensing rack to enable bottles supported in said slot in said rack to move under the influence of gravity toward said one end of said slot at which said opening is located, a gate member for controlling movement of the bottles through said slot to said opening, said gate member being pivotable between a blocking position in which said gate member blocks movement of bottles from said slot to said opening and a dispensing position in which said gate member enables the next bottle to be vended to move from said slot to said opening to be dispensed from said dispensing rack, a locking mechanism for locking said gate member to prevent said gate member from pivoting from said blocking position, and a crediting mechanism connected to said locking mechanism to unlock said locking mechanism when coins or a credit of a predetermined value are received in said crediting mechanism and said crediting mechanism is actuated to unlock said locking mechanism to allow said gate member to pivot from said blocking position to said dispensing position to enable the next bottle to be vended to move from said slot to said opening to be dispensed from said dispensing rack.

2. A vending machine for vending a plurality of bottles as is defined in claim 1 wherein said means for adjusting the distance between said parallel spaced apart side walls includes an elongate adjustment rail which forms one of said parallel spaced apart side walls of said slot and which is movable relative to the other of said parallel spaced apart side walls to vary the distance between said spaced apart side walls to thereby vary the diameter of said slot to enable said slot to accommodate bottles having varying diameters at the top portion of the bottle.

3. A vending machine for vending a plurality of bottles which are supported in an upright position only at a top portion of the bottles as defined in claim 1 wherein said gate member includes a pair of arms one of which engages with the next bottle to be vended and the other of which engages with the new bottle to be vended in said slot after the next bottle to be vended when the gate member pivots from said blocking to said dispensing positions as the next bottle to be vended moves from said slot to said opening to said dispensing station, said other arm engaging with the new next bottle to be vended to pivot said gate member to said blocking position to block movement of the new next bottle to be vended from said slot to said opening.

4. A vending machine for vending a plurality of bottles which are supported in an upright position only at a top portion of the bottles as defined in claim 3 wherein said gate members pivotable about an axis of rotation disposed substantially perpendicular to said pair of arms and located on said gate member approximately midway between said pair of arms and wherein said pair of arms control the sequential movement of bottles supported in said slot under the influence of gravity through said slot to said opening at one end thereof.

5. A machine for dispensing a plurality of bottles each of which are supported in an upright position only at a top portion of each of the bottles comprising a storage cabinet, a dispensing rack located in said storage cabinet having at least a single elongated slot located therein for storing and dispensing bottles from said dispensing rack which bottles each include a top portion which is engaged by and supported by said dispensing rack, said slot including a pair of substantially parallel spaced apart side walls which terminate at one end thereof in an opening in said dispensing rack, said pair of substantially parallel spaced apart side walls being spaced apart a distance which is less than the diameter of the top portion of the bottles which are supported in said elongated slot to prevent bottles from falling from said elongated slot when the bottles are supported by said side walls of said slot, means for adjusting the distance between said parallel spaced apart side walls of said slot to enable said slot to support bottles having various diameters at the top portion of the bottles, said opening in said dispensing rack being larger than the diameter of the top portion of the bottles which are supported in said elongated slot to enable bottles which are supported in said elongated slot to move from said slot into said opening to fall from said dispensing rack, said dispensing rack being inclined from a horizontal position in a downwardly direction toward said opening in said dispensing rack to enable bottles supported in said slot in said rack to move under the influence of gravity toward said one end of said slot at which said opening is located, and a gate member for controlling movement of the bottles through said slot to said opening.

6. A machine for dispensing a plurality of bottles each of which are supported in an upright position only at a top portion of each of the bottles as defined in claim 5 wherein said means for adjusting the distance between said parallel spaced apart side walls includes an elongate adjustment rail which forms one of said parallel spaced apart side walls of said slot and which is movable relative to the other of said parallel spaced apart side walls to vary the distance between said spaced apart side walls to thereby vary the diameter of said slot to enable said slot to accommodate bottles having varying diameters at the top portion of the bottle.

7. A machine for dispensing a plurality of bottles each of which are supported in an upright position only at the top portion of each of the bottles as defined in claim 6 wherein said gate member is pivotable between a blocking position in which said gate member blocks movement of bottles from said slot to said opening and a dispensing position in which said gate member enables the next bottle to be vended to move from said slot to said opening to be dispensed from said dispensing rack.

8. A machine for dispensing a plurality of bottles each of which are supported in an upright position only at the top portion of each of the bottles as defined in claim 7 further including a locking mechanism for locking said gate member to prevent said gate member from pivoting from said blocking position and a credit mechanism connected to said locking mechanism for unlocking said locking mechanism when a credit of a predetermined value is received in said credit mechanism and said credit mechanism is actuated to unlock said locking mechanism to allow said gate member to pivot from said blocking position to enable the next bottle to be dispensed to move from said slot to said opening to be dispensed from said dispensing rack.

9. A vending machine for vending a plurality of bottles each of which are supported in an upright position only at a top portion of each of the bottles comprising a storage cabinet, a dispensing rack located in said storage cabinet having at least a single elongated slot located therein for storing and dispensing bottles from said dispensing rack which bottles each include a top portion which is engaged by and supported by said slot in said dispensing rack, said slot including a pair of substantially parallel spaced apart side walls which terminate at one end thereof in an opening in said dispensing rack, said pair of substantially parallel spaced apart side walls being spaced apart a distance which is less than the diameter of the top portion of the bottles which are supported in said elongated slot to prevent bottles from falling from said elongated slot when the bottles are supported by said side walls of said slot, said parallel spaced apart side walls of said slot being movable relative to each other to adjust the distance between said parallel spaced apart side walls of said slot to enable said slot to support bottles having various diameters at the top portion of the bottles, said opening in said dispensing rack being larger than the diameter of the top portion of the bottles which are supported in said elongated slot to enable bottles which are supported in said elongated slot to move from said slot into said opening to be dispensed from said dispensing rack, said dispensing rack being inclined from a horizontal position in a downwardly direction toward said opening in said dispensing rack to enable bottles supported in said slot in said rack to move under the influence of gravity toward said one end of said slot at which said opening is located, a gate member for controlling movement of the bottles through said slot to said opening, said gate member having a blocking position in which said gate member blocks movement of bottles from said slot to said opening and a dispensing position in which said gate member enables the next bottle to be vended to move from said slot to said opening to be dispensed from said dispensing rack, a locking mechanism for locking said member to prevent said gate member from moving from said blocking position to said dispensing position and a crediting mechanism connected to said locking mechanism to unlock said locking mechanism when coins or a credit of a predetermined value are received in said crediting mechanism and said crediting mechanism is actuated to unlock said locking mechanism to allow said gate member to move from said blocking position to said dispensing position to enable the next bottle to be vended to move from said slot to said opening to be dispensed from said dispensing rack.

10. A vending machine for vending a plurality of bottles as is defined in claim 9 wherein said side walls of said slot further include an elongate adjustment rail which forms one of said parallel spaced apart side walls of said slot and which is moveable relative to the other of said parallel spaced apart side walls to vary the distance between said spaced apart side walls to thereby vary the diameter of said slot to enable said slot to accommodate bottles having varying diameters at the top portion of the bottle.

* * * * *